US010269329B2

(12) United States Patent
Cho et al.

(10) Patent No.: US 10,269,329 B2
(45) Date of Patent: Apr. 23, 2019

(54) SCANLINE DRIVER CHIP AND DISPLAY DEVICE INCLUDING THE SAME

(71) Applicant: SAMSUNG DISPLAY CO., LTD, Yongin, Gyeonggi-Do (KR)

(72) Inventors: Sang-Jun Cho, Seongnam-si (KR); Dong-Won Choi, Seongnam-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 45 days.

(21) Appl. No.: 14/788,446

(22) Filed: Jun. 30, 2015

(65) Prior Publication Data

US 2016/0180823 A1 Jun. 23, 2016

(30) Foreign Application Priority Data

Dec. 22, 2014 (KR) ........................ 10-2014-0185887

(51) Int. Cl.

*G06F 12/02* (2006.01)
*G09G 5/18* (2006.01)
*G09G 3/3266* (2016.01)
*G09G 3/36* (2006.01)

(52) U.S. Cl.

CPC ............. *G09G 5/18* (2013.01); *G09G 3/3266* (2013.01); *G09G 3/3674* (2013.01); *G09G 2300/0465* (2013.01); *G09G 2310/0202* (2013.01); *G09G 2310/0267* (2013.01); *G09G 2370/045* (2013.01)

(58) Field of Classification Search

CPC ...... G09G 5/39; G09G 5/222; G06F 12/0207; G06T 1/60

USPC .......................................................... 345/567

See application file for complete search history.

(56) References Cited

U.S. PATENT DOCUMENTS

| | | | | |
|---|---|---|---|---|
| 7,107,605 | B2 * | 9/2006 | Janik | G06F 3/147 375/240.25 |
| 7,882,442 | B2 * | 2/2011 | Lawther | G06F 3/1423 715/738 |
| 8,836,610 | B2 * | 9/2014 | Jang | G06F 3/1446 345/1.1 |
| 9,214,130 | B2 * | 12/2015 | Matsuda | G09G 3/3674 |

(Continued)

FOREIGN PATENT DOCUMENTS

| | | | |
|---|---|---|---|
| KR | 10-2011-0093371 | A | 8/2011 |
| KR | 10-2011-0129219 | A | 12/2011 |
| KR | 10-2014-0001607 | A | 1/2014 |

*Primary Examiner* — Gordon Liu

(74) *Attorney, Agent, or Firm* — Lewis Roca Rothgerber Christie LLP

(57) ABSTRACT

A scanline driver chip includes: a chip selection de-serializer configured to provide an output enable signal based on an enable signal, a clock signal, and serial chip selection data, the serial chip selection data being received in serial order; an address data de-serializer configured to provide parallel address data based on the enable signal, the clock signal, the output enable signal, and serial address data, the serial address data being received in serial order; and a decoder-level shifter configured to provide a scanline enable signal based on the parallel address data. A display device includes: a controller configured to provide an enable signal, a clock signal, serial chip selection data, and serial address data; a plurality of the scanline driver chips each configured to provide a scanline enable signal; and a pixel array configured to be driven based on the scanline enable signal.

20 Claims, 19 Drawing Sheets

(56) References Cited

U.S. PATENT DOCUMENTS

| | | | | |
|---|---|---|---|---|
| 2004/0164943 | A1* | 8/2004 | Ogawa | G09G 3/3655 345/92 |
| 2007/0080905 | A1* | 4/2007 | Takahara | G09G 3/3233 345/76 |
| 2007/0139354 | A1* | 6/2007 | Kim | G09G 3/3406 345/102 |
| 2011/0298789 | A1* | 12/2011 | Ko | H04N 13/0025 345/419 |
| 2016/0189607 | A1* | 6/2016 | Zhang | H01L 27/3288 345/76 |

* cited by examiner

SCANLINE DRIVER CHIP AND DISPLAY DEVICE INCLUDING THE SAME

CROSS REFERENCE TO RELATED APPLICATION

This application claims priority to and the benefit of Korean Patent Application No. 10-2014-0185887, filed on Dec. 22, 2014, in the Korean Intellectual Property Office (KIPO), the entire content of which is herein incorporated by reference.

BACKGROUND

1. Technical Field

Aspects of embodiments of the present invention relate to a display device, and more particularly to a scanline driver chip and a display device including the scanline driver chip.

2. Discussion of the Related Art

According to development of electronic devices, display devices are being developed to have higher performance and smaller size. Various researches are in progress for the downsizing of display devices.

SUMMARY

Embodiments of the present invention provide for a scanline driver chip capable of decreasing a bezel size of a display device by receiving a scanline enable signal in accordance with serially-received chip selection data and address data. Further embodiments provide for a display device capable of decreasing the bezel size of the display device by supplying the scanline enable signal in accordance with the serially-supplied chip selection data and address data.

According to an embodiment of the present invention, a scanline driver chip is provided. The scanline driver chip includes: a chip selection de-serializer configured to provide an output enable signal based on an enable signal, a clock signal, and serial chip selection data, the serial chip selection data being received in serial order; an address data de-serializer configured to provide parallel address data based on the enable signal, the clock signal, the output enable signal, and serial address data, the serial address data being received in serial order; and a decoder-level shifter configured to provide a scanline enable signal based on the parallel address data.

When the enable signal is a first logic level, the chip selection de-serializer may be activated.

When the enable signal is the first logic level and the serial chip selection data corresponding to the scanline driver chip is the first logic level, the output enable signal may be the first logic level.

When the enable signal is the first logic level and the serial chip selection data corresponding to the scanline driver chip is a second logic level, the output enable signal may be the second logic level.

When the enable signal is a second logic level, the chip selection de-serializer may be deactivated.

When the enable signal is a first logic level, the address data de-serializer may be activated.

When the enable signal is the first logic level and the output enable signal is the first logic level, the address data de-serializer may output the parallel address data based on the serial address data.

When the enable signal is the first logic level and the output enable signal is a second logic level, the address data de-serializer may not output the parallel address data.

When the enable signal is a second logic level, the address data de-serializer may be deactivated.

The decoder-level shifter may include a plurality of scanline driving circuits.

The decoder-level shifter may be configured to provide the scanline enable signal through one of the scanline driving circuits corresponding to the parallel address data.

According to another embodiment of the present invention, a display device is provided. The display device includes: a controller configured to provide an enable signal, a clock signal, serial chip selection data, and serial address data; a plurality of scanline driver chips configured to provide a scanline enable signal based on the enable signal, the clock signal, the serial chip selection data, and the serial address data, the serial chip selection data and the serial address data being received in serial order; and a pixel array configured to be driven based on the scanline enable signal.

Each of the scanline driver chips may include: a chip selection de-serializer configured to provide an output enable signal based on the enable signal, the clock signal, and the serial chip selection data, the serial chip selection data being received in serial order; an address data de-serializer configured to provide parallel address data based on the enable signal, the clock signal, the output enable signal, and the serial address data, the serial address data being received in serial order; and a decoder-level shifter configured to provide a scanline enable signal based on the parallel address data.

The display device may selectively activate the scanline driver chips based on the serial chip selection data.

The display device may be configured to concurrently activate two or more of the scanline driver chips based on the serial chip selection data.

When the display device simultaneously activates the two or more of the scanline driver chips, same data voltages may be provided to respective pixels connected to corresponding said two or more scanlines of the display device.

Each of the scanline driver chips may be configured to output the enable signal, the clock signal, the serial chip selection data, and the serial address data by buffering the enable signal, the clock signal, the serial chip selection data, and the serial address data.

When the enable signal is a first logic level, the chip selection de-serializer may be activated. When the enable signal is the first logic level and the serial chip selection data corresponding to the scanline driver chip is the first logic level, the output enable signal may be the first logic level.

When the enable signal is a first logic level, the address data de-serializer may be activated. When the enable signal is the first logic level and the output enable signal is the first logic level, the address data de-serializer may output the parallel address data based on the serial address data.

The decoder-level shifter may include a plurality of scanline driving circuits. The decoder-level shifter may be configured to provide the scanline enable signal through one of the scanline driving circuits corresponding to the parallel address data.

According to embodiments of the present invention, the scanline driver chip may decrease the bezel size of the display device by receiving the scanline enable signal in accordance with the serially-received chip selection data and address data.

BRIEF DESCRIPTION OF THE DRAWINGS

Example embodiments of the present invention will be more clearly understood from the following detailed description taken in conjunction with the accompanying drawings.

DETAILED DESCRIPTION

Figure 1:
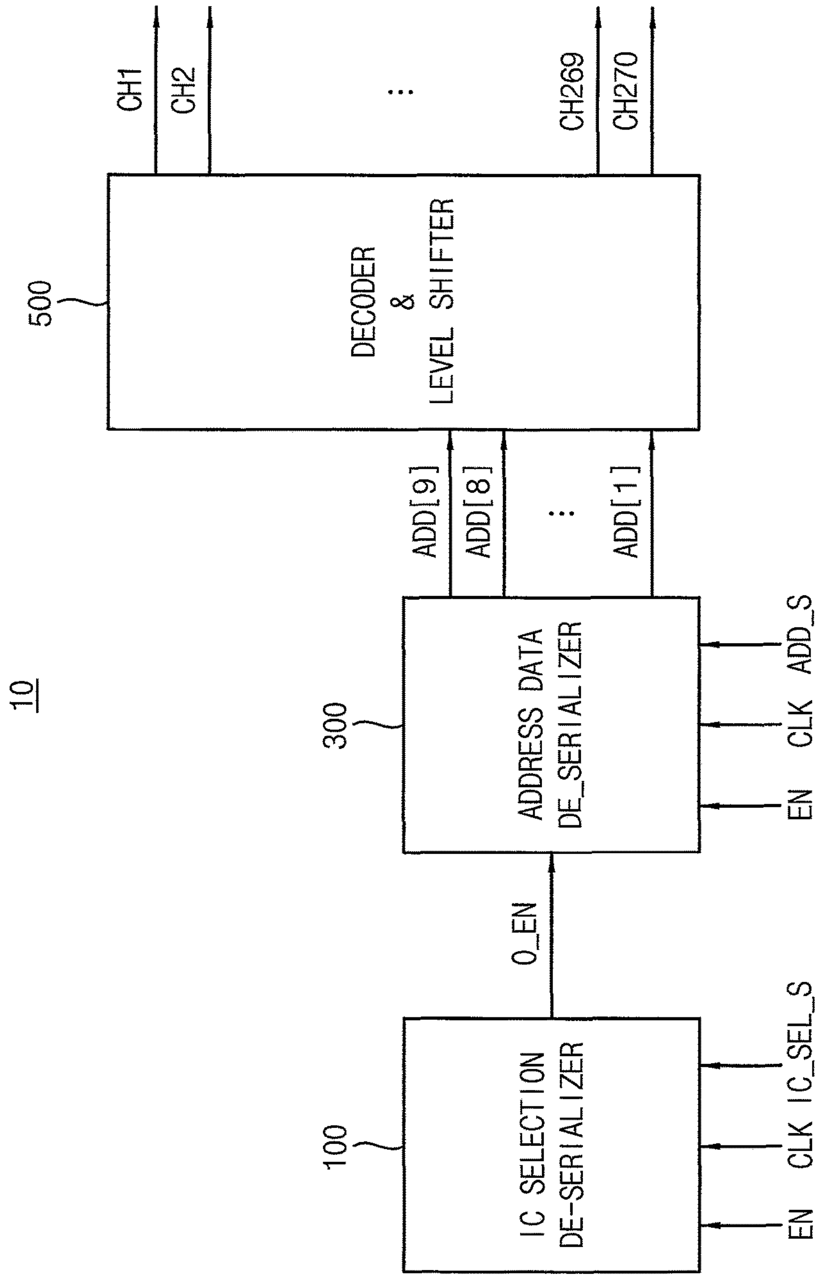
FIG. 1 is a block diagram illustrating a scanline driver chip according to an embodiment of the present invention.

Example embodiments of the present invention are described more fully hereinafter with reference to the accompanying drawings. Like or similar reference numerals refer to like or similar elements throughout.

Herein, the use of the term "may," when describing embodiments of the present invention, refers to "one or more embodiments of the present invention." In addition, the use of alternative language, such as "or," when describing embodiments of the present invention, refers to "one or more embodiments of the present invention" for each corresponding item listed.

The scanline driver chips and display devices and/or any other relevant devices or components according to embodiments of the present invention described herein may be implemented utilizing any suitable hardware, firmware (e.g., an application-specific integrated circuit), software, or a suitable combination of software, firmware, and hardware. For example, the various components of the scanline driver chips and display devices may be formed on one integrated circuit (IC) chip or on separate IC chips. Further, the various components of the scanline driver chips and display devices may be implemented on a flexible printed circuit film, a tape carrier package (TCP), a printed circuit board (PCB), or formed on a same substrate as the scanline driver chip or display device.

Further, the various components of the scanline driver chips and display devices may be a process or thread, running on one or more processors, in one or more computing devices, executing computer program instructions and interacting with other system components for performing the various functionalities described herein. The computer program instructions are stored in a memory that may be implemented in a computing device using a standard memory device, such as, for example, a random access memory (RAM). The computer program instructions may also be stored in other non-transitory computer readable media such as, for example, a CD-ROM, flash drive, or the like. In addition, a person of skill in the art should recognize that the functionality of various computing devices may be combined or integrated into a single computing device, or the functionality of a particular computing device may be distributed across one or more other computing devices without departing from the scope of the present invention.

FIG. 1 is a block diagram illustrating a scanline driver chip 10 according to an embodiment of the present invention.

Referring to FIG. 1, the scanline driver chip 10 includes a chip selection de-serializer 100, an address data de-serializer 300, and a decoder-level shifter 500. The chip selection de-serializer 100 provides an output enable signal O_EN based on an enable signal EN (such as a one-bit signal), a clock signal CLK (e.g., one bit), and serial chip selection data IC_SEL_S (e.g., four bits). The serial chip selection data IC_SEL_S may be received in serial order (e.g., one bit at a time over a serial data link, for a total of four pulses or clock cycles). As will be described further with reference to FIG. 8, the enable signal EN, the clock signal CLK, and the serial chip selection data IC_SEL_S may be provided from a controller 200.

For example, the enable signal EN may be 1 bit (and provided over one serial line), the clock signal CLK may be 1 bit (and provided over one serial line), and the serial chip selection data IC_SEL_S may be 4 bits (e.g., one bit for each of four separate scanline driver chips 10). Here, the serial chip selection data IC_SEL_S may be provided to the chip selection de-serializer 100 through one serial line, and the chip selection de-serializer 100 may receive the enable signal EN, the clock signal CLK, and the serial chip selection data IC_SEL_S from the controller 200 using three serial lines.

On the other hand, if the chip selection de-serializer 100 receives the serial chip selection data IC_SEL_S from the controller 200 using two lines in place of one serial line, the number of lines included in the bezel of a corresponding display device 20 (see FIG. 3) is increased, which may cause the bezel size of the display device 20 to be increased.

Figure 3:
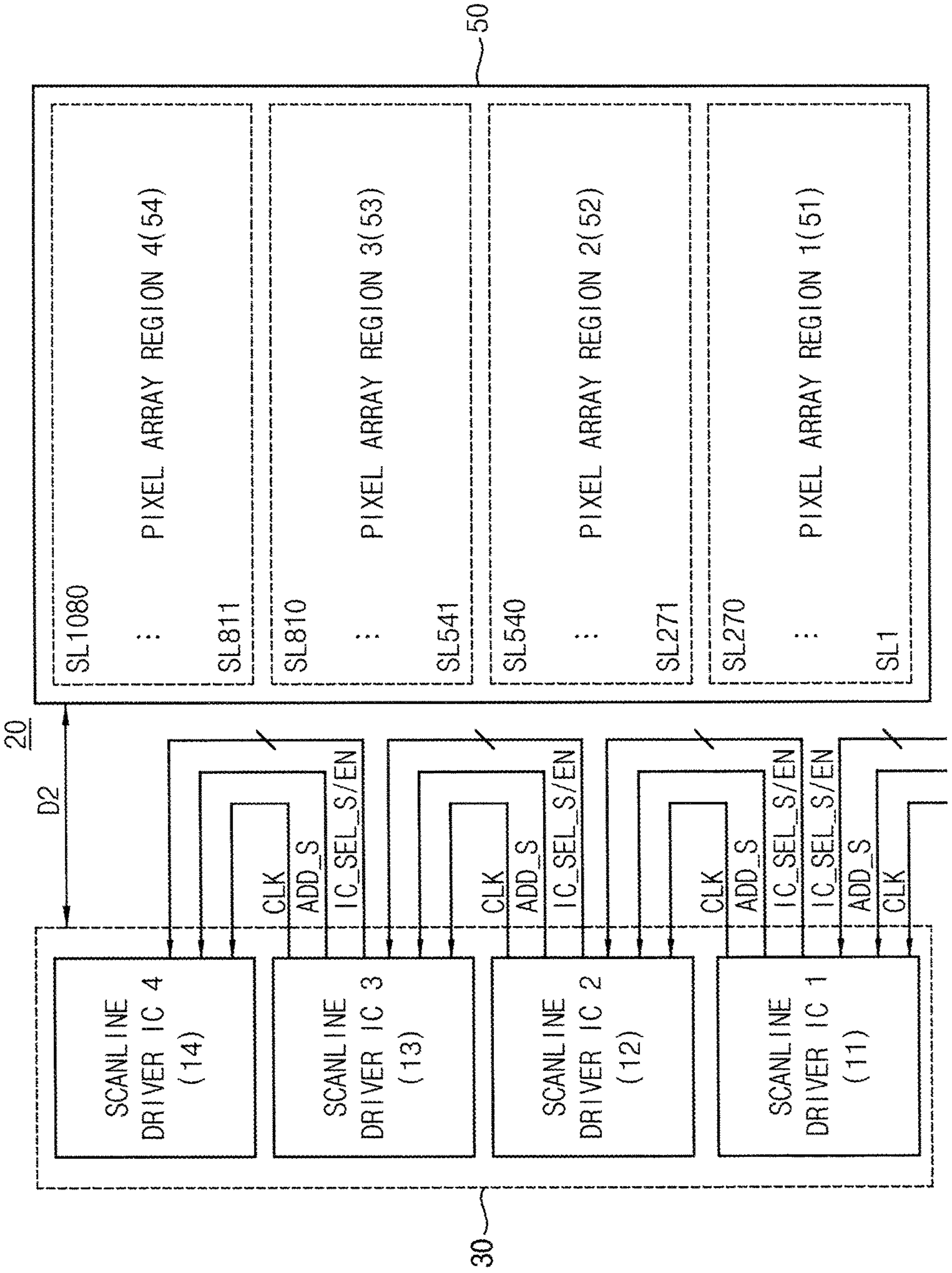
FIG. 3 is a diagram illustrating a display device including the scanline driver chip according to an embodiment of the present invention.

Considering FIG. 3 for a moment, a plurality of scanline driver chips 30 (such as the scanline driver chip 10 of FIG. 1) includes a first scanline driver chip 11, a second scanline driver chip 12, a third scanline driver chip 13, and a fourth scanline driver chip 14. If the serial chip selection data IC_SEL_S is '1000', a scanline enable signal CH (output signal of the scanline driver chip 10) may be provided from the first scanline driver chip 11. In addition, if the serial chip selection data IC_SEL_S is '0100', the scanline enable signal CH may be provided from the second scanline driver chip 12. Likewise, if the serial chip selection data IC_SEL_S is '0010', the scanline enable signal CH may be provided from the third scanline driver chip 13. Continuing in the same manner, if the serial chip selection data IC_SEL_S is '0001', the scanline enable signal CH may be provided from the fourth scanline driver chip 14. The chip selection de-serializer 100 provides an output enable signal O_EN based on the serial chip selection data IC_SEL_S that may be transferred through one serial line.

Returning to FIG. 1, the address data de-serializer 300 provides parallel address data ADD based on the enable signal EN, the clock signal CLK, the output enable signal O_EN, and serial address data ADD_S. The serial address data ADD_S may be received in serial order. The enable signal EN, the clock signal CLK, and the serial address data ADD_S may be provided from the controller 200. For example, the enable signal EN may be 1 bit (and provided over one serial line, which may be the same serial line used for the enable signal EN for the chip selection de-serializer 100), the clock signal CLK may be 1 bit (and provided over one serial line, which may be the same serial line used for the clock signal CLK for the chip selection de-serializer 100), and the serial address data ADD_S may be 9 bits.

Here, the serial address data ADD_S may be provided to the address data de-serializer 300 through one serial line, and the address data de-serializer 300 may receive the enable signal EN, the clock signal CLK, and the serial address data ADD_S from the controller 200 using three serial lines. On the other hand, if the address data de-serializer 300 receives the serial address data ADD_S from the controller 200 using a plurality of lines instead of one serial line, the number of lines included in the bezel of the display device 20 is increased, which may cause the bezel size of the display device 20 to be increased.

When the output enable signal O_EN is the first logic level (e.g., a logic high level), the address data de-serializer 300 may provide the parallel address data ADD based on the serial address data ADD_S. The first logic level may be a logic high level and the second logic level may be a logic low level. For example, the serial address data ADD_S may include first to ninth serial address data ADD_S1 to ADD_S9 transmitted over nine consecutive clock pulses over the serial line. The address data de-serializer 300 may sequentially receive the first to ninth serial address data ADD_S1 to ADD_S9.

When the address data de-serializer 300 sequentially receives the first to ninth serial address data ADD_S1 to ADD_S9, if the output enable signal O_EN is the first logic level, the address data de-serializer 300 may concurrently (e.g., simultaneously) provide the first to ninth serial address data ADD_S1 to ADD_S9 as a first to ninth parallel address data ADD[1] to ADD[9] (e.g., over one clock pulse). Here, the first serial address data ADD_S1 may be the first parallel address data ADD[1]. In addition, the second serial address data ADD_S2 may be the second parallel address data ADD[2]. Continuing in the same manner, the ninth serial address data ADD_S9 may be the ninth parallel address data ADD[9].

The decoder-level shifter 500 may provide the scanline enable signal CH based on the parallel address data ADD. For example, if parallel address data ADD is 1 (e.g., '000000001' in binary), the first scanline enable signal CH1 may be enabled. In addition, if parallel address data ADD is 2 (e.g., '000000010'), the second scanline enable signal CH2 may be enabled. Continuing in the same manner, if parallel address data ADD is 270 (e.g., '100001110'), the 270th scanline enable signal CH270 may be enabled.

The scanline driver chip 10 may receive the enable signal EN, the clock signal CLK, the serial chip selection data IC_SEL_S, and the serial address data ADD_S from a controller 200 using four serial lines. In one or more embodiments, the scanline driver chip 10 may decrease the bezel size of the display device 20 by providing the scanline enable signal CH based on the serially-received chip selection data IC_SEL_S and address data ADD_S.

Figure 2:
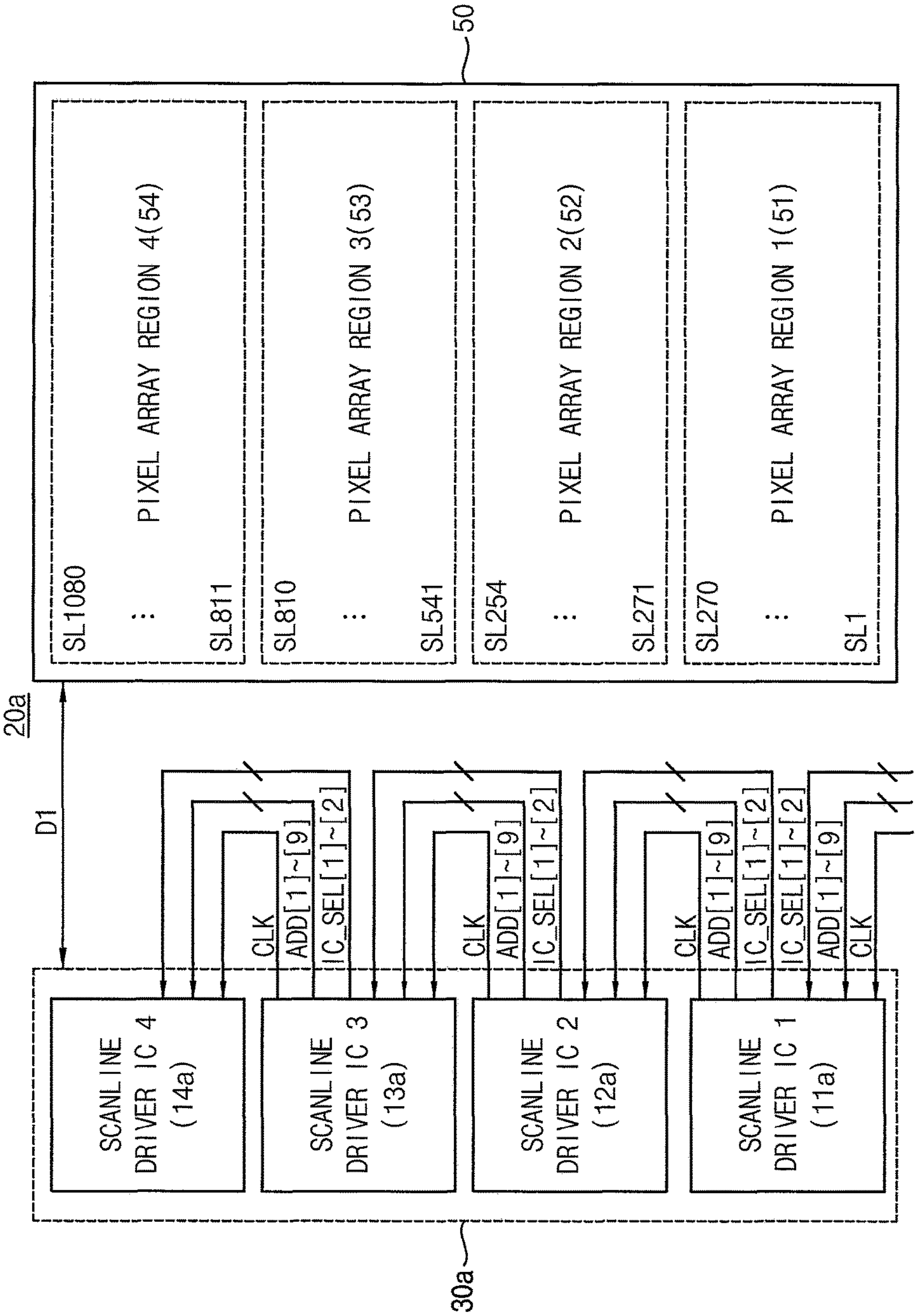
FIG. 2 is a diagram illustrating a display device including a comparable scanline driver.

FIG. 2 is a diagram illustrating a display device 20*a* including a comparable scanline driver.

Referring to FIG. 2, a comparable display device 20*a* includes a plurality of scanline driver chips 30*a* and a pixel array 50. The scanline driver chips 30*a* includes a first scanline driver chip 11*a*, a second scanline driver chip 12*a*, a third scanline driver chip 13*a*, and a fourth scanline driver chip 14*a*. The first scanline driver chip 11*a* receives a clock signal CLK, chip selection data IC_SEL, and address data ADD. The clock signal CLK may be 1 bit (and sent over one line). The chip selection data IC_SEL may be 2 bits (and sent in parallel over two lines). The address data ADD may be 9 bits (and sent in parallel over nine lines).

The sum of bits corresponding to the clock signal CLK, the chip selection data IC_SEL and the address data ADD may thus be 12 bits. To transfer these 12 bits from the controller 200 to the scanline driver chips 30*a* in parallel, 12 separate lines may be used. 12 lines to transfer 12 bits from the controller 200 to the scanline driver chips 30*a* may thus be placed between the scanline driver chips 30*a* and the pixel array 50. If 12 lines are placed between the scanline driver chips 30*a* and the pixel array 50, the bezel size of the display device 20*a* may be increased (compared to using fewer lines to send some or all of the signals serially). Here, the distance between the scanline driver chips 30*a* and the pixel array 50 may be a first distance D1.

FIG. 3 is a diagram illustrating a display device 20 including the scanline driver chip 10 of FIG. 1 according to an embodiment of the present invention.

Referring to FIG. 3 the display device 20 includes a plurality of scanline driver chips 30 and a pixel array 50. The pixel array 50 may include a plurality of pixels arranged in rows and columns, the rows corresponding to scanlines SL of the display device 20, each of the pixels being connected to a corresponding one of the scanlines SL, each of the scanlines SL being driven by a corresponding scanline enable signal CH.

The scanline driver chips 30 include a first scanline driver chip 11, a second scanline driver chip 12, a third scanline driver chip 13, and a fourth scanline driver chip 14. For example, the first scanline driver chip 11 may provide the scanline enable signal CH to a first pixel array region 51 included in the pixel array 50. In addition, the second scanline driver chip 12 may provide the scanline enable signal CH to a second pixel array region 52 included in the pixel array 50. Further, the third scanline driver chip 13 may provide the scanline enable signal CH to a third pixel array region 53 included in the pixel array 50. Continuing in the same manner, the fourth scanline driver chip 14 may provide the scanline enable signal CH to a fourth pixel array region 54 included in the pixel array 50.

For example, if the resolution of the display device 20 is full high definition (FHD), the number of the scanlines SL may be 1080. Here, the first scanline driver chip 11 may provide first to 270th scanline enable signals CH1 to CH270 to the first pixel array region 51 corresponding to the first to 270th scanlines SL1 to SL270. The second scanline driver chip 12 may provide 271th to 540th scanline enable signals CH271 to CH540 to the second pixel array region 52 corresponding to the 271st to 540th scanlines SL271 to SL540. The third scanline driver chip 13 may provide 541th to 810th scanline enable signals CH541 to CH810 to the third pixel array region 53 corresponding to the 541st to 810th scanlines SL541 to SL810. The fourth scanline driver chip 14 may provide 811th to 1080th scanline enable signals CH811 to CH1080 to the fourth pixel array region 54 corresponding to the 811th to 1080th scanlines SL811 to SL1080.

As shown in FIG. 3, the first scanline driver chip 11 receives the clock signal CLK, the enable signal EN, the serial chip selection data IC_SEL_S, and the serial address data ADD_S. The enable signal EN may be 1 bit and the clock signal CLK may be 1 bit (and each sent over serial lines). The serial chip selection data IC_SEL_S may be 4 bits (and sent over a serial line). The serial address data ADD_S may be 9 bits (and sent over a serial line). Here, the sum of bits corresponding to the clock signal CLK, the enable signal EN, the serial chip selection data IC_SEL_S, and the serial address data ADD_S may be 15 bits.

To transfer these 15 bits from the controller 200 to the scanline driver chips 30, 4 serial lines may be used. 4 serial lines to transfer these 15 bits from the controller 200 to the scanline driver chips 30 may thus be placed between the scanline driver chips 30 and the pixel array 50. If 4 serial lines are placed between the scanline driver chips 30 and the pixel array 50, the bezel size of the display device 20 may be decreased (compared to the 15 lines that may be used to send the same 15 bits of signals in parallel). Here, the distance between the scanline driver chips 30 and the pixel array 50 may be a second distance D2. The second distance D2 may be less than the first distance D1.

The scanline driver chip 10 may receive the enable signal EN, the clock signal CLK, the serial chip selection data IC_SEL_S, and the serial address data ADD_S from the controller 200 using four serial lines. In one or more embodiments, the scanline driver chip 10 may decrease the bezel size of the display device 20 by providing the scanline enable signal CH based on the serially-received chip selection data IC_SEL_S and address data ADD_S.

Figure 4:
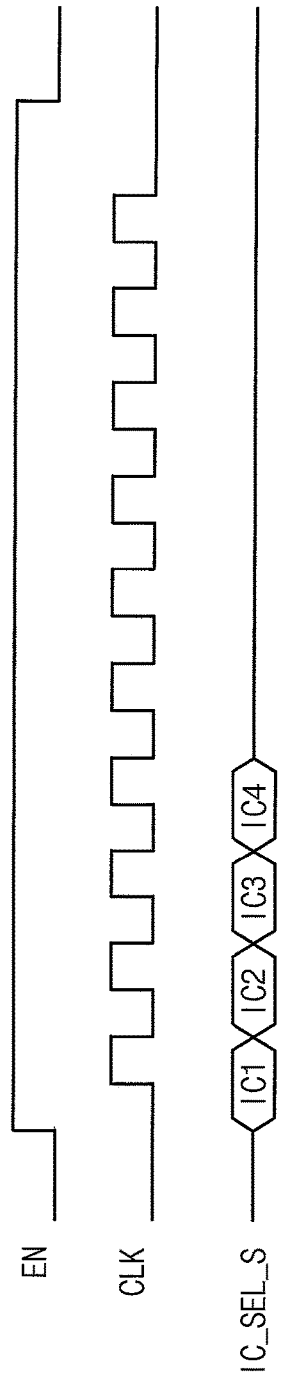
FIGS. 4 and 5 are timing diagrams illustrating an example operation of a chip selection de-serializer included in the scanline driver chip of FIG. 1 according to an embodiment of the present invention.
Figure 5:
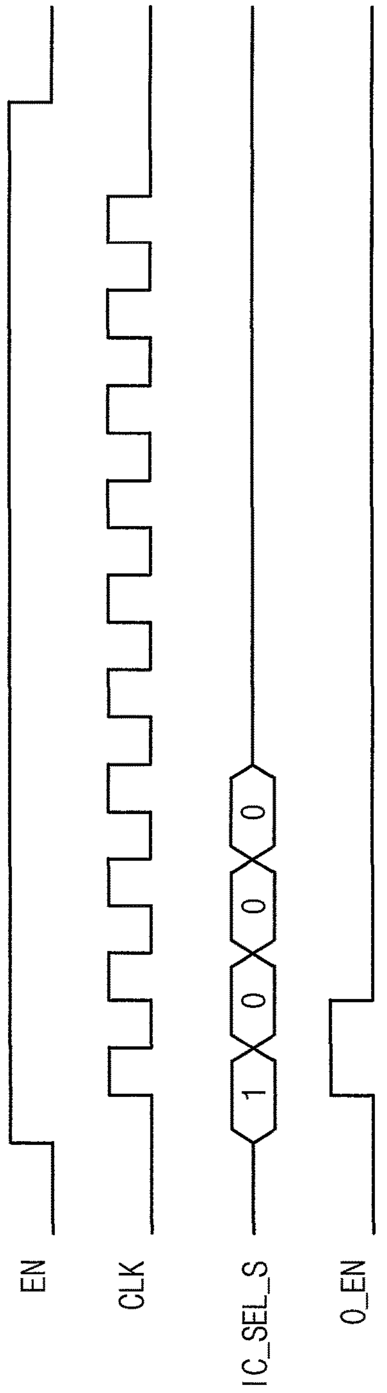

FIGS. 4 and 5 are timing diagrams illustrating an example operation of the chip selection de-serializer 100 included in the scanline driver chip 10 of FIG. 1 according to an embodiment of the present invention.

Referring to FIGS. 4 and 5, the display device 20 may include a plurality of scanline driver chips 30 (e.g., the scanline driver chips 30 may include a first scanline driver chip 11, a second scanline driver chip 12, a third scanline driver chip 13 and a fourth scanline driver chip 14) and a pixel array 50 (as illustrated in FIG. 3). Each of the scanline driver chips 30 may include a chip selection de-serializer 100 (as illustrated in FIG. 1).

In an example embodiment, if the enable signal EN is a first logic level (such as a logic high level), the chip selection de-serializer 100 may be activated. For example, if the enable signal EN is a first logic level, the chip selection de-serializer 100 in the first scanline driver chip 11, the chip selection de-serializer 100 in the second scanline driver chip 12, the chip selection de-serializer 100 in the third scanline driver chip 13, and the chip selection de-serializer 100 in the fourth scanline driver chip 14 may be activated.

In an example embodiment, if the enable signal EN is the first logic level and the serial chip selection data IC_SEL_S corresponding to the scanline driver chip 10 (e.g., the bit in the four-bit chip selection data signal corresponding to this scanline driver chip 10) is the first logic level, the output enable signal O_EN for this scanline driver chip 10 may be output as the first logic level.

The enable signal EN may transition from the second logic level to the first logic level. Here, the first logic level may be the logic high level and the second logic level may be the logic low level, as illustrated in FIGS. 4 and 5. For example, after the enable signal EN transitions from the second logic level to the first logic level, if the serial chip selection data IC_SEL_S corresponding to a first rising edge of the clock signal CLK (e.g., the bit position of the chip selection data corresponding to the first scanline driver chip 11) is the first logic level, the output enable signal O_EN that is outputted from the chip selection de-serializer 100 included in the first scanline driver chip 11 may be the first logic level, as illustrated in FIG. 5.

In addition, after the enable signal EN transitions from the second logic level to the first logic level, if the serial chip selection data IC_SEL_S corresponding to a second rising edge of the clock signal CLK (e.g., the bit position of the chip selection data corresponding to the second scanline driver chip 12) is the first logic level, the output enable signal O_EN that is outputted from the chip selection de-serializer 100 included in the second scanline driver chip 12 may be the first logic level. Continuing in the same manner, after the enable signal EN transitions from the second logic level to the first logic level, if the serial chip selection data IC_SEL_S corresponding to a fourth rising edge of the clock signal CLK (e.g., the bit position of the chip selection data corresponding to the fourth scanline driver chip 14) is the first logic level, the output enable signal O_EN that is outputted from the chip selection de-serializer 100 included in the fourth scanline driver chip 14 may be the first logic level.

In an example embodiment, if the enable signal EN is the first logic level and the serial chip selection data IC_SEL_S corresponding to the scanline driver chip 10 is the second logic level, the output enable signal O_EN may be the second logic level. For example, after the enable signal EN transitions from the second logic level to the first logic level, if the serial chip selection data IC_SEL_S corresponding to a first rising edge of the clock signal CLK (e.g., the bit position of the chip selection data corresponding to the first scanline driver chip 11) is the second logic level, the output enable signal O_EN that is outputted from the chip selection de-serializer 100 included in the first scanline driver chip 11 may be the second logic level.

In addition, after the enable signal EN transitions from the second logic level to the first logic level, if the serial chip selection data IC_SEL_S corresponding to a second rising edge of the clock signal CLK (e.g., the bit position of the chip selection data corresponding to the second scanline driver chip 12) is the second logic level, the output enable signal O_EN that is outputted from the chip selection de-serializer 100 included in the second scanline driver chip 12 may be the second logic level, as illustrated in FIG. 5. Continuing in the same manner, after the enable signal EN transitions from the second logic level to the first logic level, if the serial chip selection data IC_SEL_S corresponding to a fourth rising edge of the clock signal CLK (e.g., the bit position of the chip selection data corresponding to the fourth scanline driver chip 14) is the second logic level, the output enable signal O_EN that is outputted from the chip selection de-serializer 100 included in the fourth scanline driver chip 14 may be the second logic level.

In an example embodiment, if the enable signal EN is a second logic level, the chip selection de-serializer 100 may be deactivated. For example, if the enable signal EN is the second logic level, the chip selection de-serializer 100 in the first scanline driver chip 11, the chip selection de-serializer 100 in the second scanline driver chip 12, the chip selection de-serializer 100 in the third scanline driver chip 13, and the chip selection de-serializer 100 in the fourth scanline driver chip 14 may be deactivated (e.g., always output the output enable signal O_EN at the second logic level).

Figure 6:
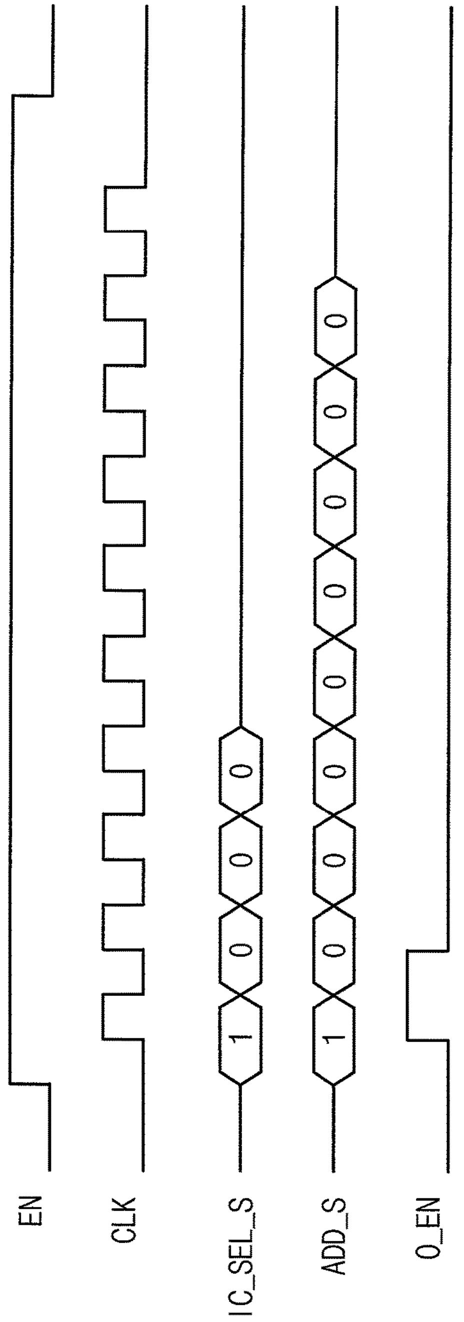
FIG. 6 is a timing diagram illustrating an operation of an address data de-serializer included in the scanline driver chip of FIG. 1 according to an embodiment of the present invention.

FIG. 6 is a timing diagram illustrating an operation of the address data de-serializer 300 included in the scanline driver chip 10 of FIG. 1 according to an embodiment of the present invention.

Referring to FIG. 6, if the enable signal EN is a first logic level, the address data de-serializer 300 may be activated. For example, the scanline driver chips 30 may include a first scanline driver chip 11, a second scanline driver chip 12, a third scanline driver chip 13 and a fourth scanline driver chip 14, as illustrated in FIG. 3. If the enable signal EN is a first logic level (e.g., a logic high level), the address data de-serializer 300 in the first scanline driver chip 11, the address data de-serializer 300 in the second scanline driver chip 12, the address data de-serializer 300 in the third scanline driver chip 13, and the address data de-serializer 300 in the fourth scanline driver chip 14 may be activated.

In an example embodiment, if the enable signal EN is the first logic level and the output enable signal O_EN is the first logic level, the address data de-serializer 300 may output the parallel address data ADD based on the serial address data ADD_S. If the enable signal EN is the first logic level and the output enable signal O_EN corresponding to the first scanline driver chip 11 is the first logic level, the address data de-serializer 300 included in the first scanline driver chip 11 may output the serial address data ADD_S as the parallel address data ADD.

In addition, if the enable signal EN is the first logic level and the output enable signal O_EN corresponding to the second scanline driver chip 12 is the first logic level, the address data de-serializer 300 included in the second scanline driver chip 12 may output the serial address data ADD_S as the parallel address data ADD. Continuing in the same manner, if the enable signal EN is the first logic level and the output enable signal O_EN corresponding to the fourth scanline driver chip 14 is the first logic level, the address data de-serializer 300 included in the fourth scanline driver chip 14 may output the serial address data ADD_S as the parallel address data ADD.

For example, if the address data de-serializer 300 sequentially receives the first to ninth serial address data ADD_S1 to ADD_S9, and if the output enable signal O_EN is the first logic level, the address data de-serializer 300 concurrently (e.g., simultaneously) provides the first to ninth serial address data ADD_S1 to ADD_S9 as the first to ninth parallel address data ADD[1] to ADD[9].

In an example embodiment, If the enable signal EN is the first logic level and the output enable signal O_EN is a second logic level, the address data de-serializer 300 may stop outputting the parallel address data ADD (e.g., may output all second logic level signals for the parallel address data ADD). For example, if the enable signal EN is the first logic level and the output enable signal O_EN corresponding to the second scanline driver chip 12 is a second logic level, the address data de-serializer 300 included in the second scanline driver chip 12 may stop outputting the parallel address data ADD.

In an example embodiment, if the enable signal EN is a second logic level, the address data de-serializer 300 may be deactivated. For example, if the enable signal EN is a second logic level, the address data de-serializer 300 in the first scanline driver chip 11, the address data de-serializer 300 in the second scanline driver chip 12, the address data de-serializer 300 in the third scanline driver chip 13, and the address data de-serializer 300 in the fourth scanline driver chip 14 may be deactivated (e.g., output all second logic level signals for the parallel address data ADD).

In one or more embodiments, the scanline driver chip 10 may decrease the bezel size of the display device 20 by providing the scanline enable signal CH based on the serially-received chip selection data IC_SEL_S and address data ADD_S.

Figure 7:
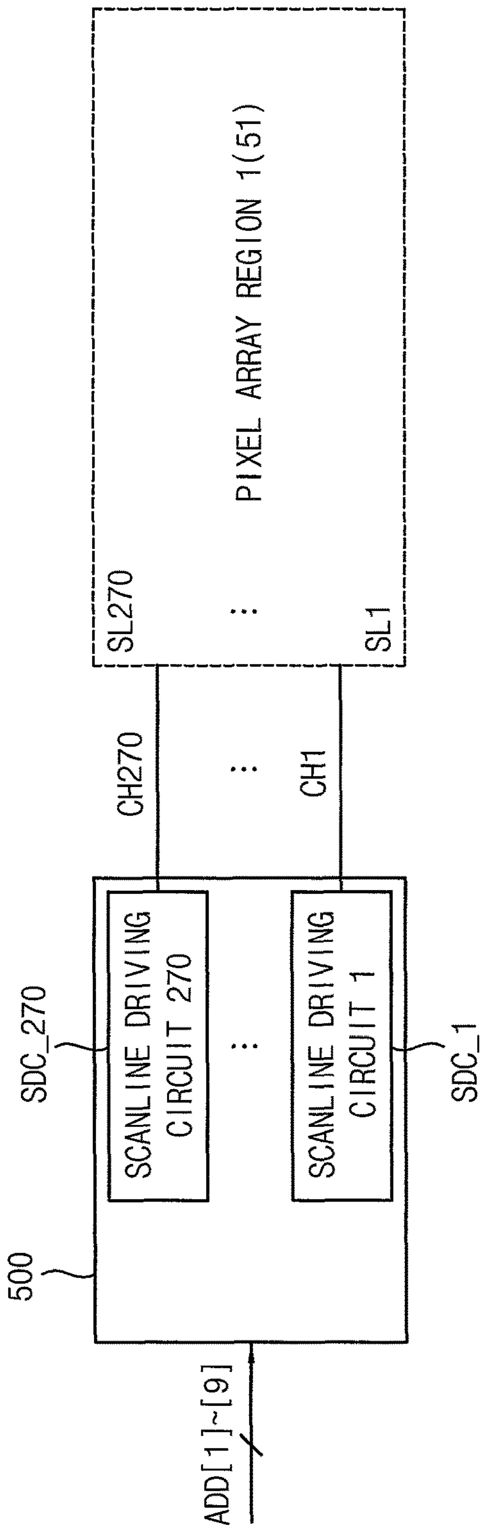
FIG. 7 is a diagram illustrating an example of a decoder-level shifter included in the scanline driver chip of FIG. 1 according to an embodiment of the present invention.

FIG. 7 is a diagram illustrating an example of the decoder-level shifter 500 included in the scanline driver chip 10 of FIG. 1 according to an embodiment of the present invention.

Referring to FIG. 7, the decoder-level shifter may include a plurality of scanline driving circuits. For example, the decoder-level shifter may include first to 270th scanline driving circuits SDC_1 to SDC_270. The decoder-level shifter may provide the scanline enable signal CH through the scanline driving circuit corresponding to the parallel address data ADD among the first to 270th scanline driving circuits SDC_1 to SDC_270. If the parallel address data ADD is 1 (e.g., '000000001' in binary), the decoder-level shifter may provide the first scanline enable signal CH1 to the first scanline SL1 through the first scanline driving circuit SDC_1. Continuing in the same manner, if the parallel address data ADD is 270 (e.g., '100001110'), the decoder-level shifter may provide the 270th scanline enable signal CH270 to the 270th scanline SL270 through the 270th scanline driving circuit SDC_270.

Figure 8:
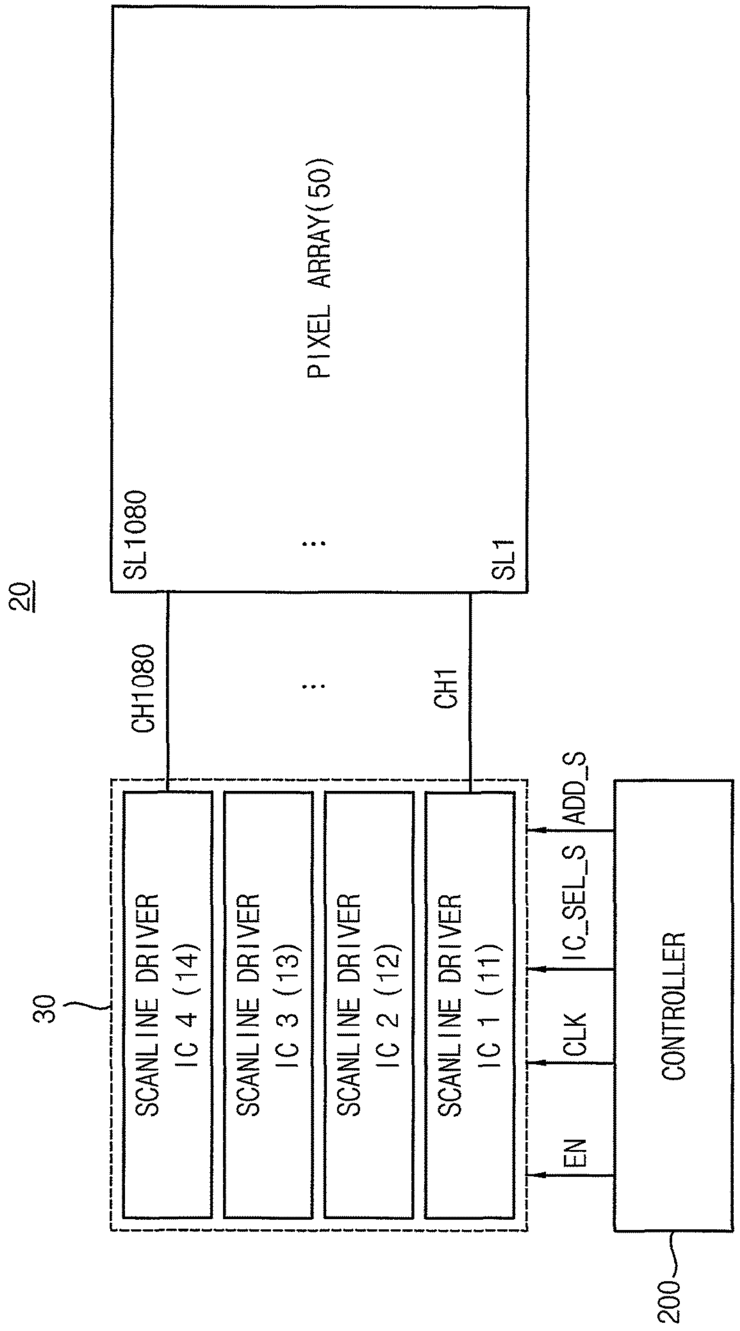
FIG. 8 is a diagram illustrating a display device according to an embodiment of the present invention.

FIG. 8 is a diagram illustrating a display device 20 according to an embodiment of the present invention.

Referring to FIGS. 1 and 8, the display device 20 includes a controller 200, a plurality of scanline driver chips 30, and a pixel array 50. The controller 200 provides an enable signal EN, a clock signal CLK, serial chip selection data IC_SEL_S, and serial address data ADD_S. The scanline driver chips 30 provide a scanline enable signal CH based on the enable signal EN, the clock signal CLK, the serial chip selection data IC_SEL_S, and the serial address data ADD_S. The serial chip selection data IC_SEL_S and the serial address data ADD_S may be received in serial order. The pixel array 50 is driven based on the scanline enable signal CH.

Each of the scanline driver chips 30 may include a chip selection de-serializer 100, an address data de-serializer 300, and a decoder-level shifter 500, as illustrated in FIG. 1. The chip selection de-serializer 100 may provide an output enable signal O_EN based on the enable signal EN, the clock signal CLK, and the serial chip selection data IC_SEL_S, which may be received in serial order. An enable signal EN, a clock signal CLK and serial chip selection data IC_SEL_S may be provided from a controller 200. For example, the enable signal EN may be 1 bit and the clock signal CLK may be 1 bit.

Further, the serial chip selection data IC_SEL_S may be 4 bits (e.g., one bit for each of four scanline driver chips 30). Here, the serial chip selection data IC_SEL_S may be provided to the chip selection de-serializer 100 through one serial line. The chip selection de-serializer 100 may thus receive the enable signal EN, the clock signal CLK, and the serial chip selection data IC_SEL_S from the controller 200 using three serial lines. By contrast, if the chip selection de-serializer 100 receives the serial chip selection data IC_SEL_S from the controller 200 using two lines instead of one serial line, the number of lines included in the bezel of the display device 20 is increased. If the number of serial lines included in the bezel of the display device 20 is increased, the bezel size of the display device 20 may be increased.

For example, the scanline driver chips 30 may include a first scanline driver chip 11, a second scanline driver chip 12, a third scanline driver chip 13 and a fourth scanline driver chip 14. If the serial chip selection data IC_SEL_S is '1000', the scanline enable signal CH may be provided from the first scanline driver chip 11. In addition, if the serial chip selection data IC_SEL_S is '0100', the scanline enable signal CH may be provided from the second scanline driver chip 12. Further, if the serial chip selection data IC_SEL_S is '0010', the scanline enable signal CH may be provided from the third scanline driver chip 13. Continuing in the same manner, if the serial chip selection data IC_SEL_S is '0001', the scanline enable signal CH may be provided from the fourth scanline driver chip 14. The chip selection de-serializer 100 provides an output enable signal O_EN based on the serial chip selection data IC_SEL_S that is transferred through one serial line.

The address data de-serializer 300 may provide parallel address data ADD based on the enable signal EN, the clock signal CLK, the output enable signal O_EN, and the serial address data ADD_S, which may be received in serial order. The enable signal EN, the clock signal CLK and the serial address data ADD_S may be provided from the controller 200. For example, the enable signal EN may be 1 bit, the clock signal CLK may be 1 bit, and the serial address data ADD_S may be 9 bits. Here, the serial address data ADD_S may be provided to the address data de-serializer 300 through one serial line.

The address data de-serializer 300 may receive the enable signal EN, the clock signal CLK, and the serial address data ADD_S from the controller 200 using three serial lines. If the address data de-serializer 300 receives the serial address data ADD_S from the controller 200 using a plurality of lines instead of one serial line, the number of lines included in the bezel of the display device 20 is increased. If the number of serial lines included in the bezel of the display device 20 is increased, the bezel size of the display device 20 may be increased.

If the output enable signal O_EN is the first logic level, the address data de-serializer 300 may provide the parallel address data ADD based on the serial address data ADD_S. The first logic level may be a logic high level and the second logic level may be a logic low level. For example, the serial address data ADD_S may include a first to ninth serial address data ADD_S1 to ADD_S9. The address data de-serializer 300 may sequentially receive the first to ninth serial address data ADD_S1 to ADD_S9. If the address data de-serializer 300 sequentially receives the first to ninth serial address data ADD_S1 to ADD_S9, and if the output enable signal O_EN is the first logic level, the address data de-serializer 300 may concurrently (e.g., simultaneously) provide the first to ninth serial address data ADD_S1 to ADD_S9 as a first to ninth parallel address data ADD[1] to ADD[9].

Here, the first serial address data ADD_S1 may be the first parallel address data ADD[1]. In addition, the second serial address data ADD_S2 may be the second parallel address data ADD[2]. Continuing in the same manner, the ninth serial address data ADD_S9 may be the ninth parallel address data ADD[9].

The decoder-level shifter 500 may provide a scanline enable signal CH based on the parallel address data ADD. For example, if parallel address data ADD is 1 (e.g., x'000000001' in binary), the first scanline enable signal CH1 may be enabled. In addition, if parallel address data ADD is 2 (e.g., '000000010'), the second scanline enable signal CH2 may be enabled. Continuing in the same manner, if parallel address data ADD is 270 (e.g., '100001110'), the 270th scanline enable signal CH270 may be enabled.

Figure 9:
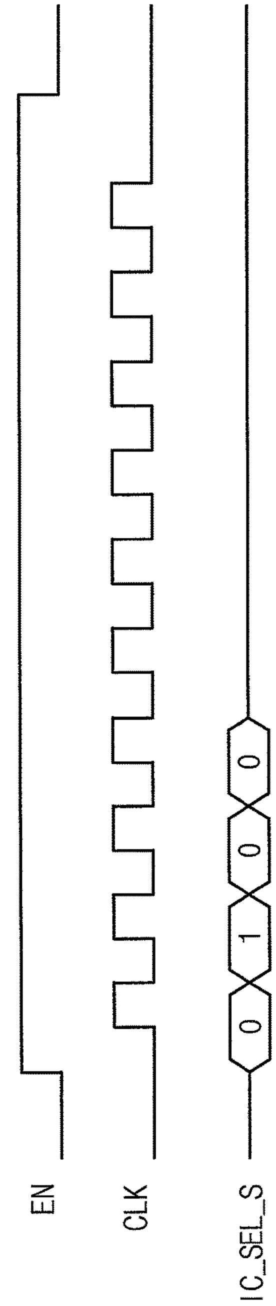
FIG. 9 is a timing diagram illustrating an example operation of the chip selection de-serializer included in the scanline driver chip of FIG. 1 according to another embodiment of the present invention.

FIG. 9 is a timing diagram illustrating an example operation of the chip selection de-serializer 100 included in the scanline driver chip 10 of FIG. 1 according to another embodiment of the present invention.

Referring to FIGS. 4, 5 and 9, the display device 20 may selectively activate the scanline driver chips 30 based on the serial chip selection data IC_SEL_S. For example, the scanline driver chips 30 may include a first scanline driver chip 11, a second scanline driver chip 12, a third scanline driver chip 13, and a fourth scanline driver chip 14, as illustrated in FIG. 8. The enable signal EN may transition from the second logic level to the first logic level. The first logic level may be the logic high level and the second logic level may be the logic low level. After the enable signal EN transitions from the second logic level to the first logic level, if the serial chip selection data IC_SEL_S corresponding to the first rising edge of the clock signal CLK (e.g., the chip selection data corresponding to the first scanline driver chip 11) is the second logic level (as illustrated in FIG. 9), the first scanline driver chip 11 may be deactivated.

In addition, after the enable signal EN transitions from the second logic level to the first logic level, if the serial chip selection data IC_SEL_S corresponding to the second rising edge of the clock signal CLK (e.g., the chip selection data corresponding to the second scanline driver chip 12) is the first logic level (as illustrated in FIG. 9), the second scanline driver chip 12 may be activated. Further, after the enable signal EN transitions from the second logic level to the first logic level, if the serial chip selection data IC_SEL_S corresponding to the third rising edge of the clock signal CLK (e.g., the chip selection data corresponding to the third scanline driver chip 13) is the second logic level (as illustrated in FIG. 9), the third scanline driver chip 13 may be deactivated.

Continuing in the same manner, after the enable signal EN transitions from the second logic level to the first logic level, if the serial chip selection data IC_SEL_S corresponding to the fourth rising edge of the clock signal CLK (e.g., the chip selection data corresponding to the fourth scanline driver chip 14) is the second logic level (as illustrated in FIG. 9), the fourth scanline driver chip 14 may be deactivated. The display device 20 may thus selectively activate the scanline driver chips 30 based on the serial chip selection data IC_SEL_S, such as only activating the second scanline driver chip 12 as illustrated in FIG. 9.

Figure 10:
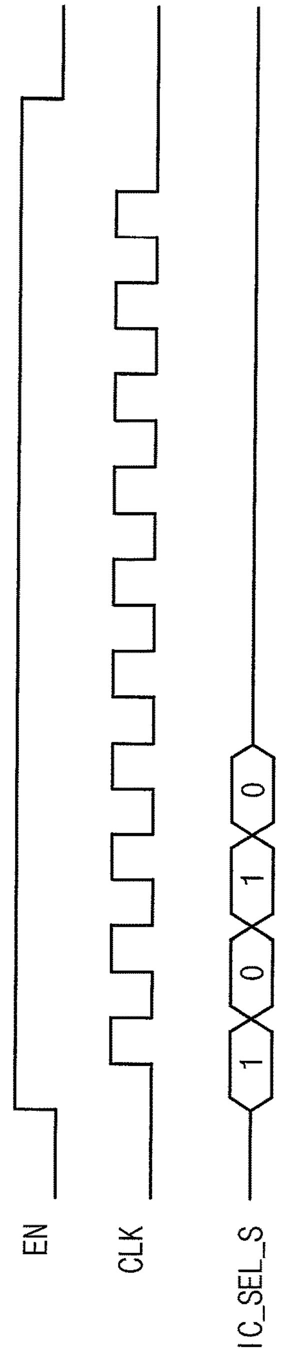
FIG. 10 is a timing diagram illustrating an example operation of the chip selection de-serializer included in the scanline driver chip of FIG. 1 according to yet another embodiment of the present invention.

FIG. 10 is a timing diagram illustrating an example operation of the chip selection de-serializer 100 included in the scanline driver chip 10 of FIG. 1 according to yet another embodiment of the present invention.

Referring to FIG. 10, the display device 20 may concurrently (e.g., simultaneously) activate two or more of the scanline driver chips 30 based on the serial chip selection data IC_SEL_S. For example, after the enable signal EN transitions from the second logic level to the first logic level, if the serial chip selection data IC_SEL_S corresponding to the first rising edge of the clock signal CLK (e.g., the chip selection data corresponding to the first scanline driver chip 11) is the first logic level (as illustrated in FIG. 10), the first scanline driver chip 11 may be activated. In addition, after the enable signal EN transitions from the second logic level to the first logic level, if the serial chip selection data IC_ SEL_S corresponding to the second rising edge of the clock signal CLK (e.g., the chip selection data corresponding to the second scanline driver chip 12) is the second logic level (as illustrated in FIG. 10), the second scanline driver chip 12 may be deactivated.

Further, after the enable signal EN transitions from the second logic level to the first logic level, if the serial chip selection data IC_SEL_S corresponding to the third rising edge of the clock signal CLK (e.g., the chip selection data corresponding to the third scanline driver chip 13) is the first logic level (as illustrated in FIG. 10), the third scanline driver chip 13 may be activated. Continuing in the same manner, after the enable signal EN transitions from the second logic level to the first logic level, if the serial chip selection data IC_SEL_S corresponding to the fourth rising edge of the clock signal CLK (e.g., the chip selection data corresponding to the fourth scanline driver chip 14) is the second logic level (as illustrated in FIG. 10), the fourth scanline driver chip 14 may be deactivated.

Thus, as illustrated in FIG. 10, the display device 20 may concurrently or simultaneously activate the first scanline driver chip 11 and the third scanline driver chip 13 among the scanline driver chips 30 based on the serial chip selection data IC_SEL_S. In one or more embodiments, the scanline driver chip 10 may decrease the bezel size of the display device 20 by providing the scanline enable signal CH based on the serially-received chip selection data IC_SEL_S and address data ADD_S.

Figure 11:
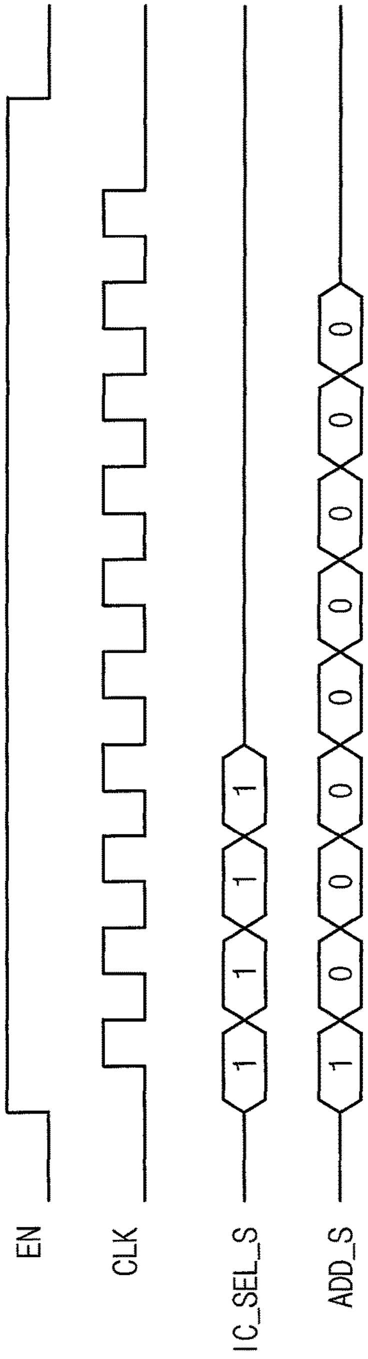
FIG. 11 is a timing diagram illustrating an example operation of the chip selection de-serializer and the address data de-serializer included in the scanline driver chip of FIG. 1 according to yet another embodiment of the present invention.
Figure 12:
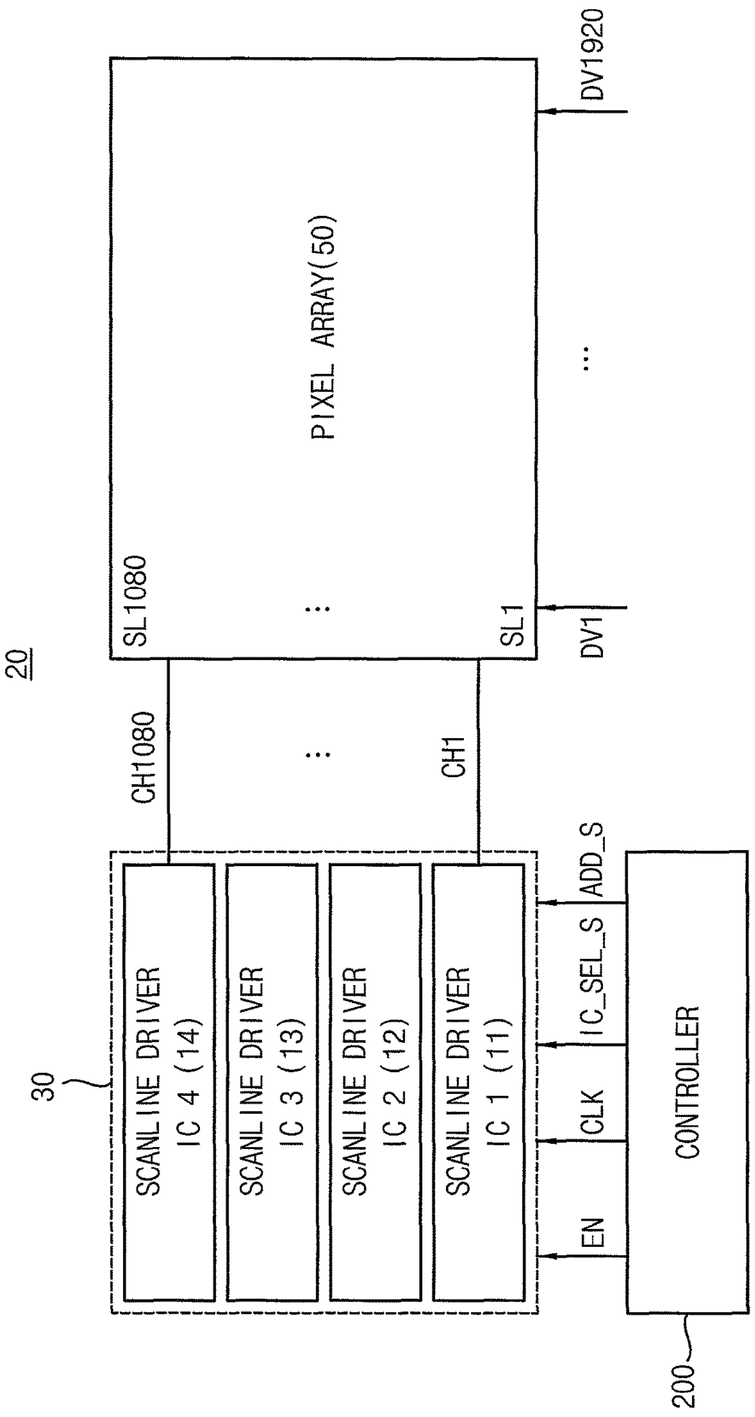
FIG. 12 is a diagram illustrating an example operation of the display device of FIG. 8 according to an embodiment of the present invention.

FIG. 11 is a timing diagram illustrating an example operation of the chip selection de-serializer 100 and the address data de-serializer 300 included in the scanline driver chip 10 of FIG. 1 according to still yet another embodiment of the present invention. FIG. 12 is a diagram illustrating an example operation of the display device 20 of FIG. 8 according to an embodiment of the present invention.

Referring to FIGS. 11 and 12, after the enable signal EN transitions from the second logic level to the first logic level, if the serial chip selection data IC_SEL_S corresponding to the first rising edge of the clock signal CLK is the first logic level, the first scanline driver chip 11 may be activated. In addition, after the enable signal EN transitions from the second logic level to the first logic level, if the serial chip selection data IC_ SEL_S corresponding to the second rising edge of the clock signal CLK is the first logic level, the second scanline driver chip 12 may be activated. Further, after the enable signal EN transitions from the second logic level to the first logic level, if the serial chip selection data IC_SEL_S corresponding to the third rising edge of the clock signal CLK is the first logic level, the third scanline driver chip 13 may be activated.

Continuing in the same manner, after the enable signal EN transitions from the second logic level to the first logic level, if the serial chip selection data IC_SEL_S corresponding to the fourth rising edge of the clock signal CLK is the first logic level, the fourth scanline driver chip 14 may be activated. As illustrated in FIG. 11, the display device 20 may thus concurrently or simultaneously activate the first scanline driver chip 11, the second scanline driver chip 12, the third scanline driver chip 13, and the fourth scanline driver chip 14 based on the serial chip selection data IC_SEL_S.

In an example embodiment, if the display device 20 concurrently or simultaneously activates two or more of the scanline driver chips 30, the same data voltages (or display voltages) may be provided to the pixels of the pixel array regions corresponding to the scanlines of the two or more of the scanline driver chips 30. For example, if the display device 20 concurrently or simultaneously activates the first scanline driver chip 11, the second scanline driver chip 12, the third scanline driver chip 13, and the fourth scanline driver chip 14 based on the serial chip selection data IC_SEL_S and the serial address data ADD_S is '000000001', the same data voltages DV1 to DV1920 may be provided to the pixels that are connected to the first scanline SL1 of the first pixel array region 51 corresponding to the first scanline driver chip 11, the pixels that are connected to the first scanline SL271 of the second pixel array region 52 corresponding to the second scanline driver chip 12, the pixels that are connected to the first scanline SL541 of the third pixel array region 53 corresponding to the third scanline driver chip 13, and the pixels that are connected to the first scanline SL811 of the fourth pixel array region 54 corresponding to the fourth scanline driver chip 14.

Figure 13:
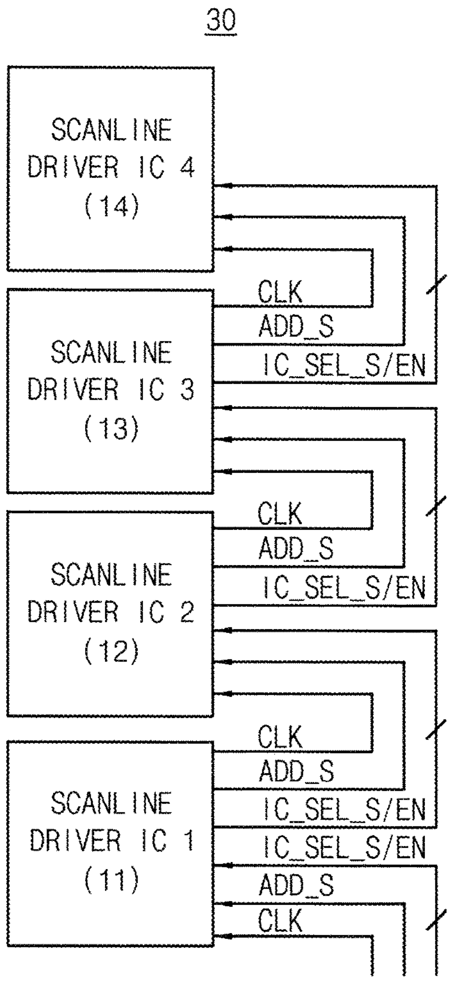
FIG. 13 is a diagram illustrating an example operation of a plurality of scanline driver chips included in the display device of FIG. 8 according to an embodiment of the present invention.
Figure 14:
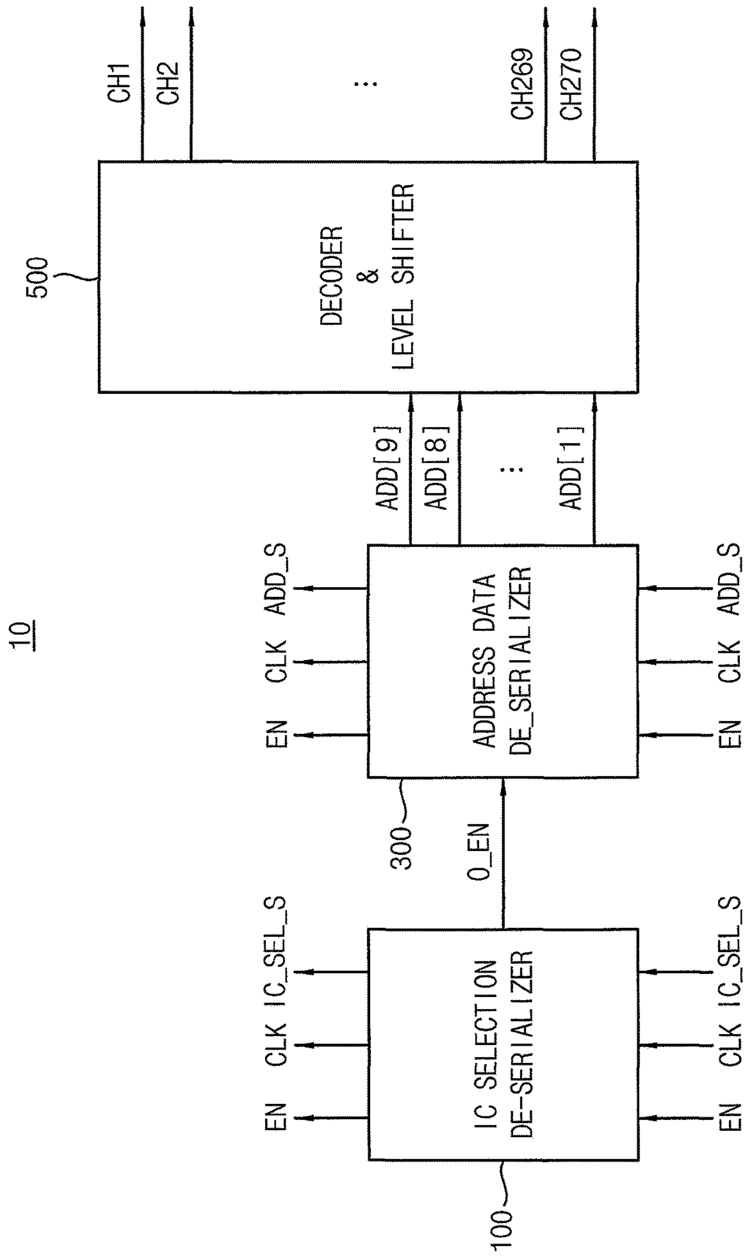
FIG. 14 is a block diagram illustrating an example scanline driver chip included in the display device of FIG. 8 according to an embodiment of the present invention.

FIG. 13 is a diagram illustrating an example operation of the scanline driver chips 30 included in the display device 20 of FIG. 8 according to an embodiment of the present invention. FIG. 14 is a block diagram illustrating an example scanline driver chip 10 included in the display device 20 of FIG. 8 according to an embodiment of the present invention.

Referring to FIGS. 13 and 14, a scanline driver chip 10 includes a chip selection de-serializer 100, an address data de-serializer 300, and a decoder-level shifter 500. The chip selection de-serializer 100 provides an output enable signal O_EN based on an enable signal EN, a clock signal CLK, and serial chip selection data IC_SEL_S, which may be received in serial order. The address data de-serializer 300 provides parallel address data ADD based on the enable signal EN, the clock signal CLK, the output enable signal O_EN, and serial address data ADDS, which may be received in serial order. The decoder-level shifter 500 provides a scanline enable signal CH based on the parallel address data ADD.

In an example embodiment, each of the scanline driver chips 30 may output the enable signal EN, the clock signal CLK, the serial chip selection data IC_SEL_S and the serial address data ADD_S by buffering the enable signal EN, the clock signal CLK, the serial chip selection data IC_SEL_S, and the serial address data ADD_S. For example, the scanline driver chips 30 may include a first scanline driver chip 11, a second scanline driver chip 12, a third scanline driver chip 13, and a fourth scanline driver chip 14, as illustrated in FIG. 13. The first scanline driver chip 11 may output the enable signal EN, the clock signal CLK, the serial chip selection data IC_SEL_S, and the serial address data ADDS to the second scanline driver chip 12 by buffering the enable signal EN, the clock signal CLK, the serial chip selection data IC_SEL_S, and the serial address data ADD_S.

In addition, the second scanline driver chip 12 may output the enable signal EN, the clock signal CLK, the serial chip selection data IC_SEL_S, and the serial address data ADD_S to the third scanline driver chip 13 by buffering the enable signal EN, the clock signal CLK, the serial chip selection data IC_SEL_S, and the serial address data ADD_S. Continuing in the same manner, the third scanline driver chip 13 may output the enable signal EN, the clock signal CLK, the serial chip selection data IC_SEL_S, and the serial address data ADD_S to the fourth scanline driver chip 14 by buffering the enable signal EN, the clock signal CLK, the serial chip selection data IC_SEL_S, and the serial address data ADD_S. In one or more embodiments, the scanline driver chip 10 may decrease the bezel size of the display device 20 by providing the scanline enable signal CH based on the serially-received chip selection data IC_SEL_S and address data ADD_S.

Figure 15:
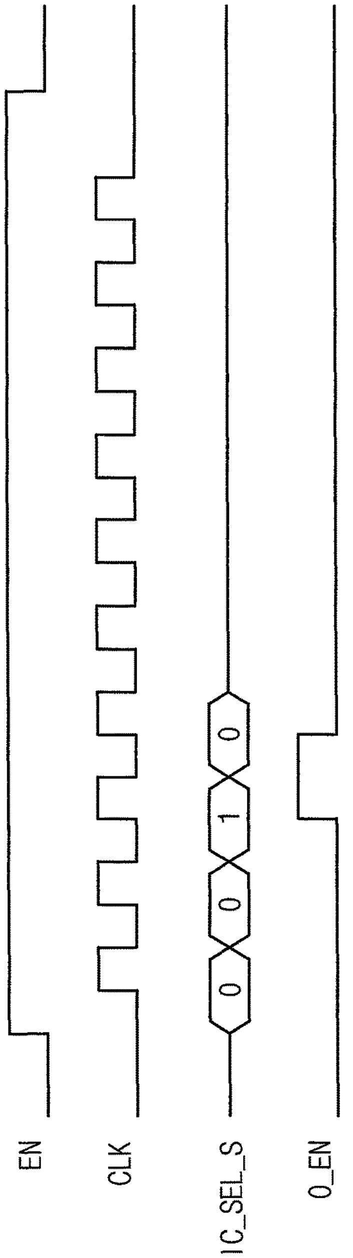
FIG. 15 is a timing diagram illustrating an example operation of a chip selection de-serializer included in the scanline driver chip of FIG. 14 according to an embodiment of the present invention.

FIG. 15 is a timing diagram illustrating an example operation of the chip selection de-serializer 100 included in the scanline driver chip 10 of FIG. 14 according to an embodiment of the present invention.

Referring to FIG. 15, if the enable signal EN is a first logic level (e.g., a logic high level), the chip selection de-serializer 100 may be activated. For example, if the enable signal EN is a first logic level, the chip selection de-serializer 100 in the first scanline driver chip 11, the chip selection de-serializer 100 in the second scanline driver chip 12, the chip selection de-serializer 100 in the third scanline driver chip 13, and the chip selection de-serializer 100 in the fourth scanline driver chip 14 may be activated.

If the enable signal EN is the first logic level and the serial chip selection data IC_ SEL_ S corresponding to the scanline driver chip 10 is the first logic level, the output enable signal O_EN output by the chip selection de-serializer 100 may be the first logic level. For example, the enable signal EN may transition from the second logic level to the first logic level. The first logic level may be the logic high level and the second logic level may be the logic low level. After the enable signal EN transitions from the second logic level to the first logic level, if the serial chip selection data IC_SEL_S corresponding to a first rising edge of the clock signal CLK (e.g., the chip selection data corresponding to the first scanline driver chip 11) is the second logic level (as illustrated in FIG. 15), the output enable signal O_EN that is outputted from the chip selection de-serializer 100 included in the first scanline driver chip 11 may be the second logic level.

In addition, after the enable signal EN transitions from the second logic level to the first logic level, if the serial chip selection data IC_SEL_S corresponding to a second rising edge of the clock signal CLK (e.g., the chip selection data corresponding to the second scanline driver chip 12) is the second logic level (as illustrated in FIG. 15), the output enable signal O_EN that is outputted from the chip selection de-serializer 100 included in the second scanline driver chip 12 may be the second logic level.

Further, after the enable signal EN transitions from the second logic level to the first logic level, if the serial chip selection data IC_SEL_S corresponding to a third rising edge of the clock signal CLK (e.g., the chip selection data corresponding to the third scanline driver chip 13) is the first logic level (as illustrated in FIG. 15), the output enable signal O_EN that is outputted from the chip selection de-serializer 100 included in the third scanline driver chip 13 may be the first logic level. Continuing in the same manner, after the enable signal EN transitions from the second logic level to the first logic level, if the serial chip selection data IC_SEL_S corresponding to a fourth rising edge of the clock signal CLK (e.g., the chip selection data corresponding to the fourth scanline driver chip 14) is the second logic level, the output enable signal O_EN that is outputted from the chip selection de-serializer 100 included in the fourth scanline driver chip 14 may be the second logic level.

Figure 16:
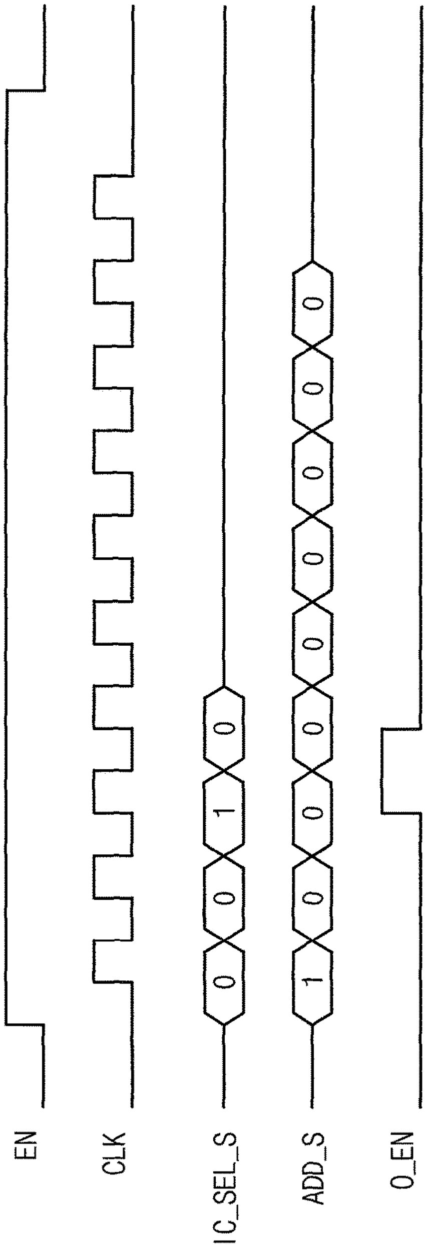
FIG. 16 is a timing diagram illustrating an example operation of an address data de-serializer included in the scanline driver chip of FIG. 14 according to an embodiment of the present invention.

FIG. 16 is a timing diagram illustrating an example operation of the address data de-serializer 300 included in the scanline driver chip 10 of FIG. 14 according to an embodiment of the present invention.

Referring to FIG. 16, if the enable signal EN is a first logic level, the address data de-serializer 300 may be activated. For example, if the enable signal EN is a first logic level, the address data de-serializer 300 in the first scanline driver chip 11, the address data de-serializer 300 in the second scanline driver chip 12, the address data de-serializer 300 in the third scanline driver chip 13, and the address data de-serializer 300 in the fourth scanline driver chip 14 may be activated.

If the enable signal EN is the first logic level and the output enable signal O_EN is the first logic level, the address data de-serializer 300 may output the parallel address data ADD based on the serial address data ADD_S. For example, the scanline driver chips 30 may include a first scanline driver chip 11, a second scanline driver chip 12, a third scanline driver chip 13, and a fourth scanline driver chip 14. If the enable signal EN is the first logic level and the output enable signal O_EN corresponding to the third scanline driver chip 13 is the first logic level (as illustrated in FIG. 16), the address data de-serializer 300 included in the third scanline driver chip 13 may output the serial address data ADD_S as the parallel address data ADD. Here, the parallel address data ADD may be '000000001'.

In an example embodiment, the decoder-level shifter may include a plurality of scanline driving circuits. The decoder-level shifter may provide the scanline enable signal CH through the scanline driving circuit corresponding to the parallel address data ADD among the scanline driving circuits.

In one or more embodiments, the scanline driver chip 10 may decrease the bezel size of the display device 20 by providing the scanline enable signal CH based on the serially-received chip selection data IC_SEL_S and address data ADD_S.

Figure 17:
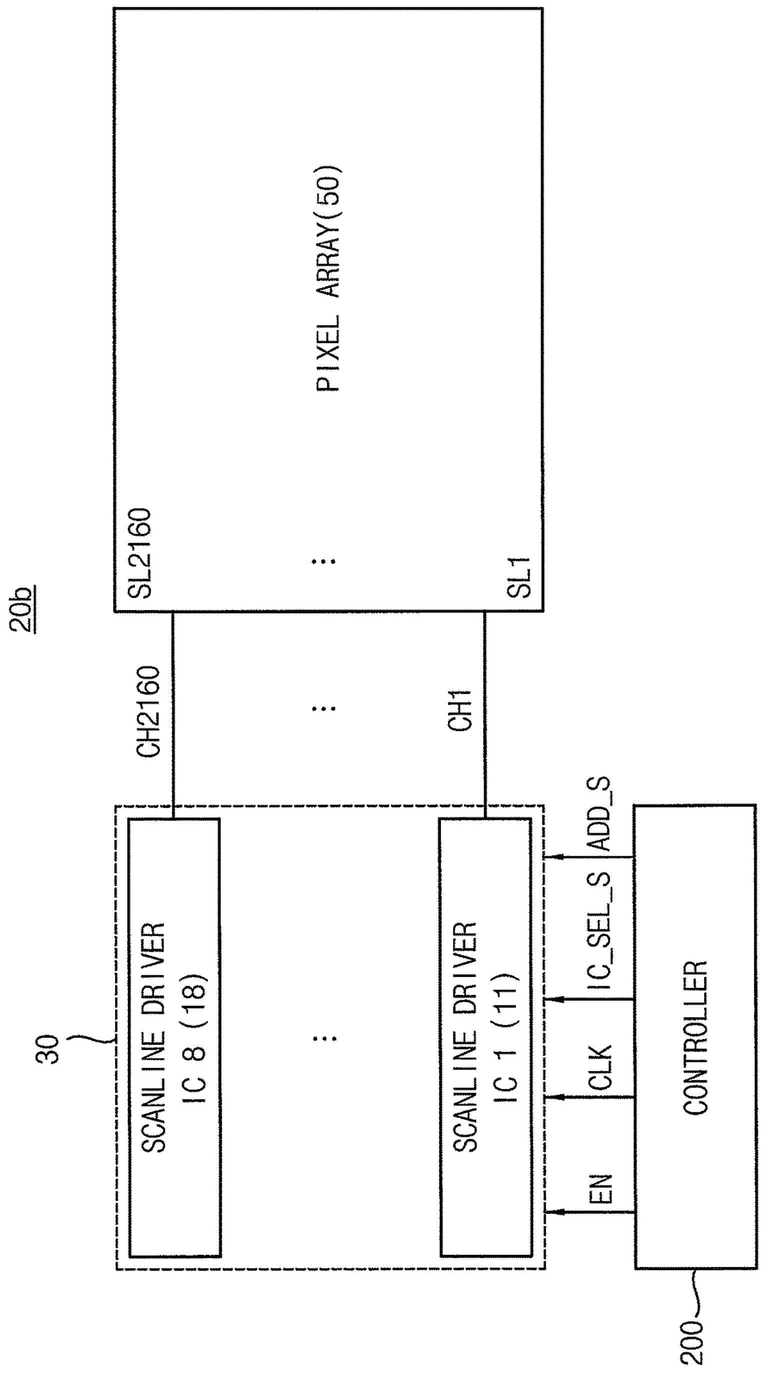
FIG. 17 is a block diagram illustrating an ultra high definition (UHD) resolution display device according to according to an embodiment of the present invention.
Figure 18:
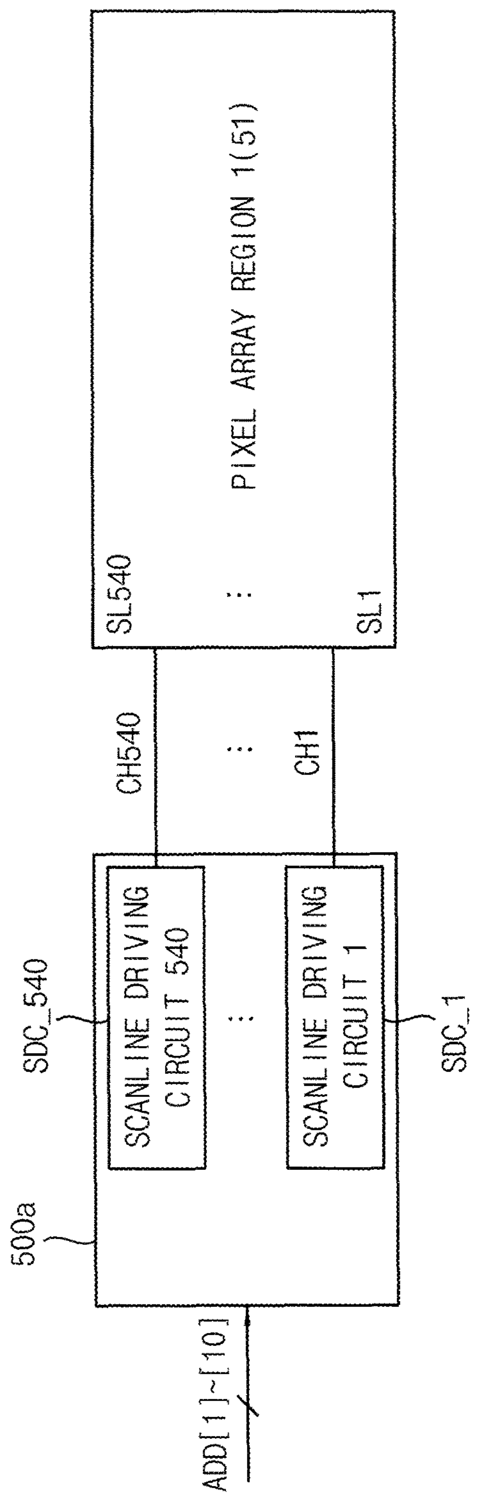
FIG. 18 is a diagram illustrating an example decoder-level shifter included in the scanline driver chip of FIG. 14 according to another embodiment of the present invention.

FIG. 17 is a block diagram illustrating an ultra high definition (UHD) resolution display device 20*b* according to an embodiment of the present invention. FIG. 18 is a diagram illustrating an example decoder-level shifter 500*a* included in the scanline driver chip 10 of FIG. 14 according to another embodiment of the present invention.

Referring to FIGS. 1, 17, and 18, the display device 20*b* includes a controller 200, a plurality of scanline driver chips 30, and a pixel array 50. The controller 200 provides an enable signal EN, a clock signal CLK, serial chip selection data IC_SEL_S, and serial address data ADD_S. The scanline driver chips 30 provide a scanline enable signal CH based on the enable signal EN, the clock signal CLK, the serial chip selection data IC_SEL_S, and the serial address data ADD_S. The serial chip selection data IC_SEL_S and the serial address data ADD_S may be received in serial order. The pixel array 50 is driven based on the scanline enable signal CH.

The scanline driver chip 10 includes a chip selection de-serializer 100, an address data de-serializer 300, and a decoder-level shifter 500. The chip selection de-serializer 100 provides an output enable signal O_EN based on an enable signal EN, a clock signal CLK, and serial chip selection data IC_SEL_S. The serial chip selection data IC_SEL_S may be received in serial order. The address data de-serializer 300 provides parallel address data ADD based on the enable signal EN, the clock signal CLK, the output enable signal O_EN, and serial address data ADD_S. The serial address data ADD_S may be received in serial order. The decoder-level shifter 500 provides a scanline enable signal CH based on the parallel address data ADD.

For example, if the resolution of the display device 20 is ultra high definition (UHD), the number of scanlines SL may be 2160. Here, the first scanline driver chip 11 may provide first to 270th scanline enable signals CH1 to CH270 to the first pixel array region 51 corresponding to the first to 270th scanlines SL1 to SL270. The second scanline driver chip 12 may provide 271th to 540th scanline enable signals CH271 to CH540 to the second pixel array region 52. The third scanline driver chip 13 may provide 541th to 810th scanline enable signals CH541 to CH810 to the third pixel array region 53 corresponding to the 541th to 810th scanlines SL541 to SL810. The fourth scanline driver chip 14 may provide 811th to 1080th scanline enable signals CH811 to CH1080 to the fourth pixel array region 54 corresponding to the 811th to 1080th scanlines SL811 to SL1080.

Continuing in the same manner, the eighth scanline driver chip 18 may provide 1891th to 2160th scanline enable signals CH1891 to CH2160 to the eighth pixel array region 58. In another embodiment, as illustrated in FIG. 18, if a scanline driver chip 10 includes a decoder-level shifter 500*a* having 540 scanline driving circuits SDC_1 to SDC_540, the display device 20 having UHD resolution may be implemented using 4 such scanline driver chips 10. It should be noted such a chip may use another address data bit (e.g., a tenth serial address data ADD_S10 and corresponding parallel address data ADD[10]) to index the additional 270 scanlines driven by the decoder-level shifter 500*a*.

Figure 19:
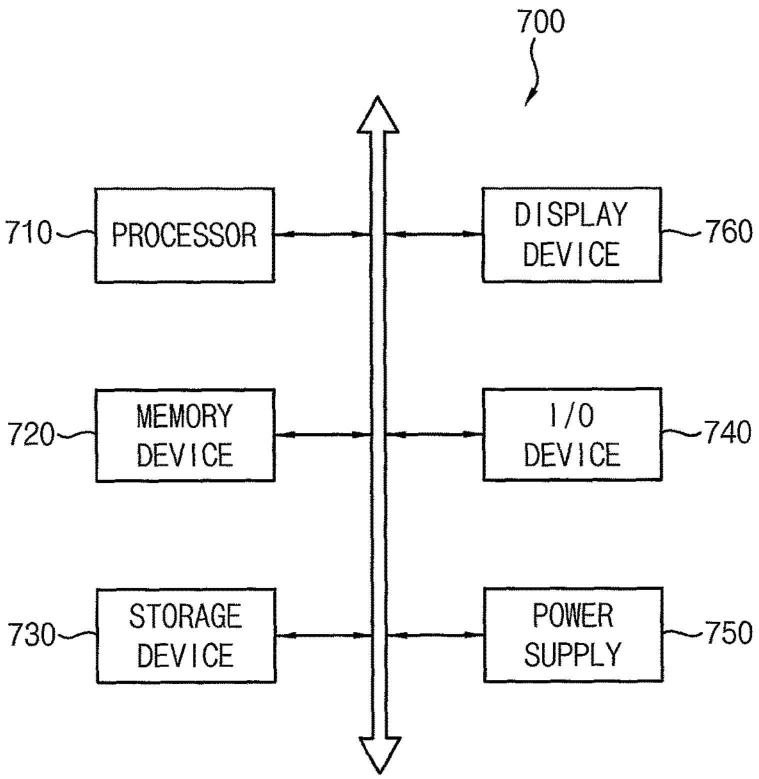
FIG. 19 is a block diagram illustrating a mobile device according to an embodiment of the present invention.

FIG. 19 is a block diagram illustrating a mobile device 700 according to according to an embodiment of the present invention.

Referring to FIG. 19, the mobile device 700 includes a processor 710, a memory device 720, a storage device 730, an input/output (I/O) device 740, a power supply 750, and an electroluminescent display device 760. The mobile device 700 may further include a plurality of ports for communicating a video card, a sound card, a memory card, a universal serial bus (USB) device, or other electronic systems.

The processor 710 may perform various computing functions or tasks. The processor 710 may be, for example, a microprocessor, a central processing unit (CPU), etc. The processor 710 may be connected to other components via an address bus, a control bus, a data bus, etc. Further, the processor 710 may be coupled to an extended bus such as a peripheral component interconnection (PCI) bus.

The memory device 720 may store data for operations of the mobile device 700. For example, the memory device 720 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano-floating gate memory (NFGM) device, a polymer random access memory (PoRAM) device, a magnetic random access memory (MRAM) device, a ferroelectric random access memory (FRAM) device, and/or at least one volatile memory device such as a dynamic random access memory (DRAM) device, a static random access memory (SRAM) device, a mobile dynamic random access memory (mobile DRAM) device, etc.

The storage device 730 may be, for example, a solid-state drive (SSD) device, a hard disk drive (HDD) device, a CD-ROM device, etc. The I/O device 740 may be, for example, an input device such as a keyboard, a keypad, a mouse, a touch screen, and/or an output device such as a printer, a speaker, etc. The power supply 750 may supply power for operating the mobile device 700. The electroluminescent display device 760 may communicate with other components via the buses or other communication links.

The present embodiments may be applied to any mobile device or any computing device. For example, the present embodiments may be applied to a cellular phone, a smart phone, a tablet computer, a personal digital assistant (PDA), a portable multimedia player (PMP), a digital camera, a music player, a portable game console, a navigation system, a video phone, a personal computer (PC), a server computer, a workstation, a tablet computer, a laptop computer, etc.

In one or more embodiments, the scanline driver chip 10 may decrease the bezel size of the display device by providing the scanline enable signal CH based on the serially-received chip selection data IC_SEL_S and address data ADD_S.

The foregoing is illustrative of example embodiments of the present invention and is not to be construed as limiting thereof. Although a few example embodiments have been described, those skilled in the art will readily appreciate that many modifications are possible in the example embodiments without materially departing from the novel teachings and aspects of the present invention. Accordingly, all such modifications are intended to be included within the scope of the present invention as defined in the claims. Therefore, it is to be understood that the foregoing is illustrative of various example embodiments and the present invention is not to be construed as limited to the specific example embodiments disclosed, and that modifications to the disclosed example embodiments, as well as other example embodiments, are intended to be included within the scope of the appended claims and equivalents thereof.

What is claimed is:

1. A scanline driver chip that is one of a plurality of scanline driver chips included in a display device, the scanline driver chip comprising:
- a chip selection de-serializer configured to provide an output enable signal based on an enable signal, a clock signal, and serial chip selection data, the serial chip selection data comprising a first plurality of bits being received in serial order;
- an address data de-serializer configured to provide parallel address data based on the enable signal, the clock signal, the output enable signal, and serial address data, the serial address data comprising a second plurality of bits being received in serial order; and
- a decoder-level shifter configured to provide a scanline enable signal from a plurality of scanline enable signals to a scanline of a plurality of scanlines, the scanline enable signal being specified, among the plurality of scanline enable signals, by the first plurality of bits of the serial chip selection data and the second plurality of bits of the serial address data,
- wherein, when a current serial address data and a next serial address data differ by a value greater than 1, a current scanline enable signal and a next scanline enable signal are respectively provided to two of the plurality of scanlines that are spaced apart from each other, wherein the current scanline enable signal and the next scanline enable signal are configured to control providing data voltages to pixels that are connected to the two of the plurality of scanlines that are spaced apart from each other, wherein the first plurality of bits of the serial chip selection data are configured to activate the plurality of scanline driver chips, respectively, and wherein, when two or more of the first plurality of bits are a first logic level, two or more of the plurality of scanline driver chips corresponding to the two or more of the first plurality of bits are substantially simultaneously activated.

2. The scanline driver chip of claim 1, wherein, when the enable signal is the first logic level, the chip selection de-serializer is activated.

3. The scanline driver chip of claim 2, wherein, when the enable signal is the first logic level and the serial chip selection data corresponding to the scanline driver chip is the first logic level, the output enable signal is the first logic level.

4. The scanline driver chip of claim 2, wherein, when the enable signal is the first logic level and the serial chip selection data corresponding to the scanline driver chip is a second logic level, the output enable signal is the second logic level.

5. The scanline driver chip of claim 1, wherein, when the enable signal is a second logic level, the chip selection de-serializer is deactivated.

6. The scanline driver chip of claim 1, wherein, when the enable signal is the first logic level, the address data de-serializer is activated.

7. The scanline driver chip of claim 6, wherein, when the enable signal is the first logic level and the output enable signal is the first logic level, the address data de-serializer outputs the parallel address data based on the serial address data.

8. The scanline driver chip of claim 6, wherein, when the enable signal is the first logic level and the output enable signal is a second logic level, the address data de-serializer does not output the parallel address data.

9. The scanline driver chip of claim 1, wherein, when the enable signal is a second logic level, the address data de-serializer is deactivated.

10. The scanline driver chip of claim 1, wherein the decoder-level shifter comprises a plurality of scanline driving circuits.

11. The scanline driver chip of claim 10, wherein the decoder-level shifter is configured to provide the scanline enable signal through one of the scanline driving circuits corresponding to the parallel address data.

12. A display device comprising:

a pixel array comprising a plurality of pixels arranged in rows and columns, the rows corresponding to a plurality of scanlines, each of the pixels in a row being connected to a corresponding one of the scanlines;

a controller configured to provide an enable signal, a clock signal, serial chip selection data comprising a first plurality of bits, and serial address data comprising a second plurality of bits; and a plurality of scanline driver chips configured to provide a scanline enable signal from a plurality of scanline enable signals based on the enable signal, the clock signal, the serial chip selection data, and the serial address data, each of the scanline enable signals corresponding to one of the scanlines, the scanline enable signal being specified, among the plurality of scanline enable signals, by the first plurality of bits of the serial chip selection data and the second plurality of bits of the serial address data, the first plurality of bits of the serial chip selection data and the second plurality of bits of the serial address data being received in serial order, wherein, when a current serial address data and a next serial address data differ by a value greater than 1, a current scanline enable signal and a next scanline enable signal are respectively provided to two of the plurality of scanlines that are spaced apart from each other, wherein the current scanline enable signal and the next scanline enable signal are configured to control providing data voltages to pixels that are connected to the two of the plurality of scanlines that are spaced apart from each other, wherein the first plurality of bits of the serial chip selection data are configured to activate the plurality of scanline driver chips, respectively, and wherein, when two or more of the first plurality of bits are a first logic level, two or more of the plurality of scanline driver chips corresponding to the two or more of the first plurality of bits are substantially simultaneously activated.

13. The display device of claim 12, wherein each of the scanline driver chips comprises:

a chip selection de-serializer configured to provide an output enable signal based on the enable signal, the clock signal, and the serial chip selection data, the serial chip selection data being received in serial order;

an address data de-serializer configured to provide parallel address data based on the enable signal, the clock signal, the output enable signal, and the serial address data, the serial address data being received in serial order; and a decoder-level shifter configured to provide a scanline enable signal based on the parallel address data.

14. The display device of claim 13, wherein the display device selectively activates the scanline driver chips based on the serial chip selection data.

15. The display device of claim 13, wherein the display device is configured to concurrently activate two or more of the scanline driver chips based on the serial chip selection data.

16. The display device of claim 15, wherein, when the display device simultaneously activates the two or more of the scanline driver chips, same data voltages are provided to respective pixels connected to corresponding said two or more scanlines of the display device.

17. The display device of claim 13, wherein each of the scanline driver chips is configured to output the enable signal, the clock signal, the serial chip selection data, and the serial address data by buffering the enable signal, the clock signal, the serial chip selection data, and the serial address data.

18. The display device of claim 13, wherein, when the enable signal is the first logic level, the chip selection de-serializer is activated, and wherein, when the enable signal is the first logic level and the serial chip selection data corresponding to the scanline driver chip is the first logic level, the output enable signal is the first logic level.

19. The display device of claim 13, wherein, when the enable signal is the first logic level, the address data de-serializer is activated, and wherein, when the enable signal is the first logic level and the output enable signal is the first logic level, the address data de-serializer outputs the parallel address data based on the serial address data.

20. The display device of claim 13, wherein the decoder-level shifter comprises a plurality of scanline driving circuits, and wherein the decoder-level shifter is configured to provide the scanline enable signal through one of the scanline driving circuits corresponding to the parallel address data.

* * * * *